US011856429B2

(12) United States Patent
Desai et al.

(10) Patent No.: US 11,856,429 B2
(45) Date of Patent: Dec. 26, 2023

(54) DYNAMIC SPECTRUM ACCESS MODE BASED ON STATION CAPABILITIES

(71) Applicant: Cisco Technology, Inc., San Jose, CA (US)

(72) Inventors: Vishal S. Desai, San Jose, CA (US); Pooya Monajemi, San Jose, CA (US); Young Il Choi, San Jose, CA (US); Santosh B. Kulkarni, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 169 days.

(21) Appl. No.: 17/454,340

(22) Filed: Nov. 10, 2021

(65) Prior Publication Data

US 2023/0147828 A1    May 11, 2023

(51) Int. Cl.
*H04W 24/08* (2009.01)
*H04B 17/345* (2015.01)
*H04L 1/00* (2006.01)

(52) U.S. Cl.
CPC .......... *H04W 24/08* (2013.01); *H04B 17/345* (2015.01); *H04L 1/0013* (2013.01)

(58) Field of Classification Search
CPC ... H04W 24/08; H04W 72/541; H04W 84/12; H04B 17/345; H04L 1/0013
See application file for complete search history.

(56) References Cited

U.S. PATENT DOCUMENTS 8,081,104 B2    12/2011  Hansen
9,306,722 B2    4/2016   Rangarajan et al.
(Continued)

FOREIGN PATENT DOCUMENTS

EP    3866545 A1    8/2021
WO   2019245265 A1  12/2019
WO   2021010606 A1   1/2021
(Continued)

OTHER PUBLICATIONS

Alfred Asterjadhi et al., "IEEE P802.11—Task Group Be (EHT) Meeting Update," Task Group Leadership, Accessed Nov. 4, 2021, pp. 1-10.

Der-Jiunn Deng et al., "IEEE 802.11ax: Highly Efficient WLANs for Intelligent Information Infrastructure", IEEE Communications Magazine, Dec. 2017, pp. 1-8.
(Continued)

*Primary Examiner* — Jae Y Lee
(74) *Attorney, Agent, or Firm* — Patterson + Sheridan, LLP

(57) ABSTRACT

Dynamic spectrum access mode based on station capabilities is provided by categorizing functionalities of Access Points (APs) and mobile stations (STA) in a wireless network; identifying interference induced by external signaling devices on channels in the wireless network; calculating an impact factor of the interference based on proximity of the external signaling devices to the wireless network, a pattern of the external signaling devices, and an extent of overlap with frequencies used by the external signaling devices and the wireless network; and in response to identifying a given STA that is paired with a given AP in the wireless network, wherein the given STA and the given AP are both categorized as being capable of both multilink communications and preamble puncturing, assigning network resources for the given STA to communicate with the given AP via one of multilink communications or preamble puncturing based on the impact factor of the interference.

20 Claims, 5 Drawing Sheets

(56) References Cited

U.S. PATENT DOCUMENTS

| | | | |
|---|---|---|---|
| 10,541,778 | B1 | 1/2020 | Cizdziel et al. |
| 2014/0315506 | A1 | 10/2014 | Rezk et al. |
| 2017/0273083 | A1 | 9/2017 | Chen et al. |
| 2019/0327740 | A1 | 10/2019 | Verma et al. |
| 2020/0015220 | A1 | 1/2020 | Cizdziel et al. |
| 2020/0288523 | A1* | 9/2020 | Patil ................. H04W 76/15 |
| 2020/0305164 | A1 | 9/2020 | Yang et al. |
| 2022/0116192 | A1* | 4/2022 | Noh ..................... H04L 5/14 |
| 2023/0105964 | A1* | 4/2023 | Park ................ H04B 17/347 |
| | | | 370/318 |
| 2023/0132900 | A1* | 5/2023 | Lopez ............... H04L 1/0068 |
| | | | 370/329 |
| 2023/0164700 | A1* | 5/2023 | Park ............... H04W 52/243 |
| | | | 455/522 |
| 2023/0232452 | A1* | 7/2023 | Li .................... H04W 74/08 |
| | | | 370/329 |

FOREIGN PATENT DOCUMENTS

| | | | |
|---|---|---|---|
| WO | 2021075725 | A1 | 4/2021 |
| WO | 2021112621 | A1 | 6/2021 |

OTHER PUBLICATIONS

PCT, Notification of Transmittal of The International Search Report and The Written Opinion of The International Searching Authority, or The Declaration for Application PCT/US2022/079228 dated Jan. 30, 2023.

\* cited by examiner

DYNAMIC SPECTRUM ACCESS MODE BASED ON STATION CAPABILITIES

TECHNICAL FIELD

Embodiments presented in this disclosure generally relate to wireless communications. More specifically, embodiments disclosed herein provide for improved bandwidth usage based on the capabilities of devices accessing a shared wireless network.

BACKGROUND

In a wireless network, especially publically accessible networks, the various devices often have different capabilities, and may run hardware or software that are not using the same version one another. The wireless communications standards used by these devices, such as the IEEE 802.11 family of "Wi-Fi" standards, often offer backwards compatibility between different devices, so that devices running newer versions can communicate with devices running older versions of the standard. However, as communications standards progress, the devices using the newer standard often have additional capabilities that the devices using the older standard lack.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
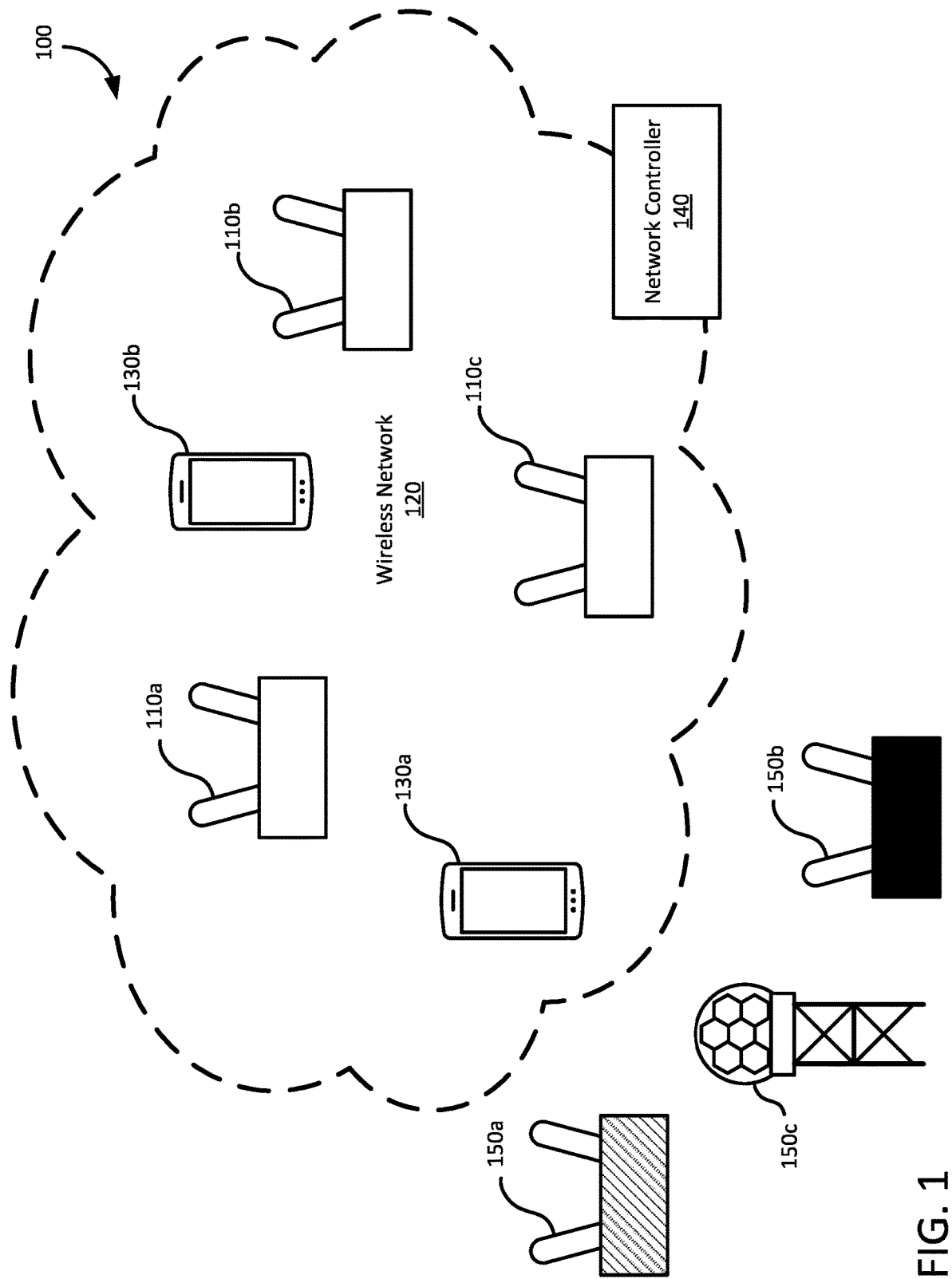
FIG. 1 illustrates a network environment, according to embodiments of the present disclosure.

One embodiment presented in this disclosure is a method, comprising: categorizing functionalities of Access Points (APs) and mobile stations (STA) in a wireless network; identifying interference induced by external signaling devices on channels used by the wireless network; calculating an impact factor of the interference based on a proximity of the external signaling devices to the wireless network, a pattern of the external signaling devices, and an extent of overlap with frequencies used by the external signaling devices and the wireless network; and in response to identifying a given STA that is paired with a given AP in the wireless network, wherein the given STA and the given AP are both categorized as being capable of both multilink communications and preamble puncturing, assigning network resources for the given STA to communicate with the given AP via one of multilink communications or preamble puncturing based on the impact factor of the interference.

One embodiment presented in this disclosure is a system, comprising: a processor; and a memory including instructions that when performed by the processor configure the process to perform operations comprising: categorizing functionalities of Access Points (APs) and mobile stations (STAs) in a wireless network; identifying interference induced by external signaling devices on channels used by the wireless network; calculating an impact factor of the interference based on a proximity of the external signaling devices to the wireless network, a duty cycle of the external signaling devices, and an extent of overlap with frequencies used by the external signaling devices and the wireless network; and in response to identifying a given STA that is paired with a given AP in the wireless network, wherein the given STA and the given AP are both categorized as being capable of both multilink communications and preamble puncturing, assigning network resources for the given STA to communicate with the given AP via one of multilink communications or preamble puncturing based on the impact factor of the interference.

One embodiment presented in this disclosure is a non-transitory computer readable storage medium storing instructions that when executed by a processor perform operations comprising: categorizing functionalities of Access Points (APs) and mobile stations (STAs) in a wireless network; identifying interference induced by external signaling devices on channels used by the wireless network; calculating an impact factor of the interference based on a proximity of the external signaling devices to the wireless network, a duty cycle of the external signaling devices, and an extent of overlap with frequencies used by the external signaling devices and the wireless network; and in response to identifying a given STA that is paired with a given AP in the wireless network, wherein the given STA and the given AP are both categorized as being capable of both multilink communications and preamble puncturing, assigning network resources for the given STA to communicate with the given AP via one of multilink communications or preamble puncturing based on the impact factor of the interference.

EXAMPLE EMBODIMENTS

The present disclosure relates to dynamic spectrum access to allow greater use of bandwidth in a network environment. User Equipment (UE) and Access Points (APs) in the environment are evaluated to determine the associated signaling capabilities for the devices and whether different access modes would provide better or more efficient use of the available bandwidth. Depending on the capabilities of the UEs and APs in the environment (e.g., what the UEs and APs are capable or incapable of performing), and the competing sources for the available bandwidth, a multilink operation or a preamble puncturing operation can be biased for selection when scheduling communications. As users may delay deployment of devices with the latest capabilities, categorizing the functionalities of the actual devices connected to or providing the network, and biasing operation of the network in accordance with those functionalities thereby allow a network provider to more efficiently allocate bandwidth and channel assignment in preparation for known interference sources and competing signaling devices.

FIG. 1 illustrates a network environment 100, according to embodiments of the present disclosure. In FIG. 1, one or more Access Points (APs) 110a-d (generally or collectively, AP 110) provide a wireless network 120 to various mobile stations (STA) 130a-b (generally or collectively STA 130) in the environment 100. In various aspects, the wireless network 120 is a cellular or Wi-Fi based network offered to users in a public or private venue. In various embodiments, the wireless network 120 includes a network controller 140 that communicates with the APs 110 to coordinate network management among the APs 110, although the APs 110 can also manage the network among themselves, thus omitting the network controller 140 in some embodiments.

The APs 110 can offer wireless communication sessions in the wireless network 120 according to various Radio Access Technologies (RAT) and communications standards such as, but not limited to, "Wi-Fi" networking according to the various families, sub-standards, and derivatives of the IEEE 802.11 standard, cellular networking including various generations and subtypes thereof, such as, Long Term Evolution (LTE) and Fifth Generation New Radio (5G NR) networks, Citizens Broadband Radio Service (CBRS) networks, or the like. Example hardware as may be included in an AP 110 is discussed in greater detail in regard to FIG. 5.

The STAs 130 may include any computing device that can wirelessly connect to one or more APs 110. Example STAs 130 can include, but are not limited to: smart phones, feature phones, tablet computers, laptop computers, desktop computers, Internet of Things (IoT) devices, and the like. In various embodiments, the STAs 130 can also be referred to as a User Equipment (UE), a client device (CD), a user device, or an endpoint. Example hardware as may be included in a STA 130 is discussed in greater detail in regard to FIG. 5.

The network controller 140, if included, may include any computing device or cloud based service that is configured to interface with two or more APs 110 to coordinate how spectrum and services are shared in the environment 100. The network controller 140 can be provided on a separate computing device connected to the individual APs 110 via wired or wireless communications, may be included with a "central" or "commander" AP 110, or may be provided in an ad hoc arrangement via a collective of two or more APs 110 negotiating among themselves for network management. Accordingly, any action ascribed to the network controller 140 in an example given in the present disclosure may also or instead be ascribed to one or more of the APs 110. Example hardware as may be included in a network controller 140 is discussed in greater detail in regard to FIG. 5.

In addition to the members of the wireless network 120, various external signaling devices 150a-c (generally or collectively, external signaling device 150) may consume or compete for the bandwidth used in the wireless network 120. For example, devices in neighboring wireless networks under the control of a different party, may seek to use some or all of the bandwidth used by the wireless network 120 according to the same family of communications standards (e.g., as part of an Overlapping Basic Service Set (OBSS)). These devices using the same communications standard can include managed neighbors 150a in a shared or partnered network that the network controller 140 can negotiate with for access to the shared spectrum or for pre-planning when the other network will use the shared spectrum, or rogue APs 150b that do not coordinate with the network controller 140 for access to the shared spectrum (e.g., leaving the network controller 140 to react to the spectrum use choices of the rogue AP 150b).

In external signaling devices that use the same family of communications standards as the wireless network 120, various incumbent signaling devices 150c with higher priority or legacy access rights to the spectrum can use the shared spectrum according to a different signaling standard (for communications or other purposes). For example, a weather station may use some or all of the bandwidth used by the wireless network 120 for Doppler signals (e.g., a different transmission standard than the wireless network 120). In various embodiments, the network controller 140 may defer to incumbent users with higher-priority access to the share bandwidth. When deferring access to an incumbent signaling device 150c (e.g., such as a weather station), where the network controller 140 abandons or yields those portions of the spectrum to the external signaling devices 150 when a legacy communications standard has higher-priority access to the shared portions of spectrum, allows the incumbent signaling device 150c full access to the shared channel for a least a given time period.

Figure 2:
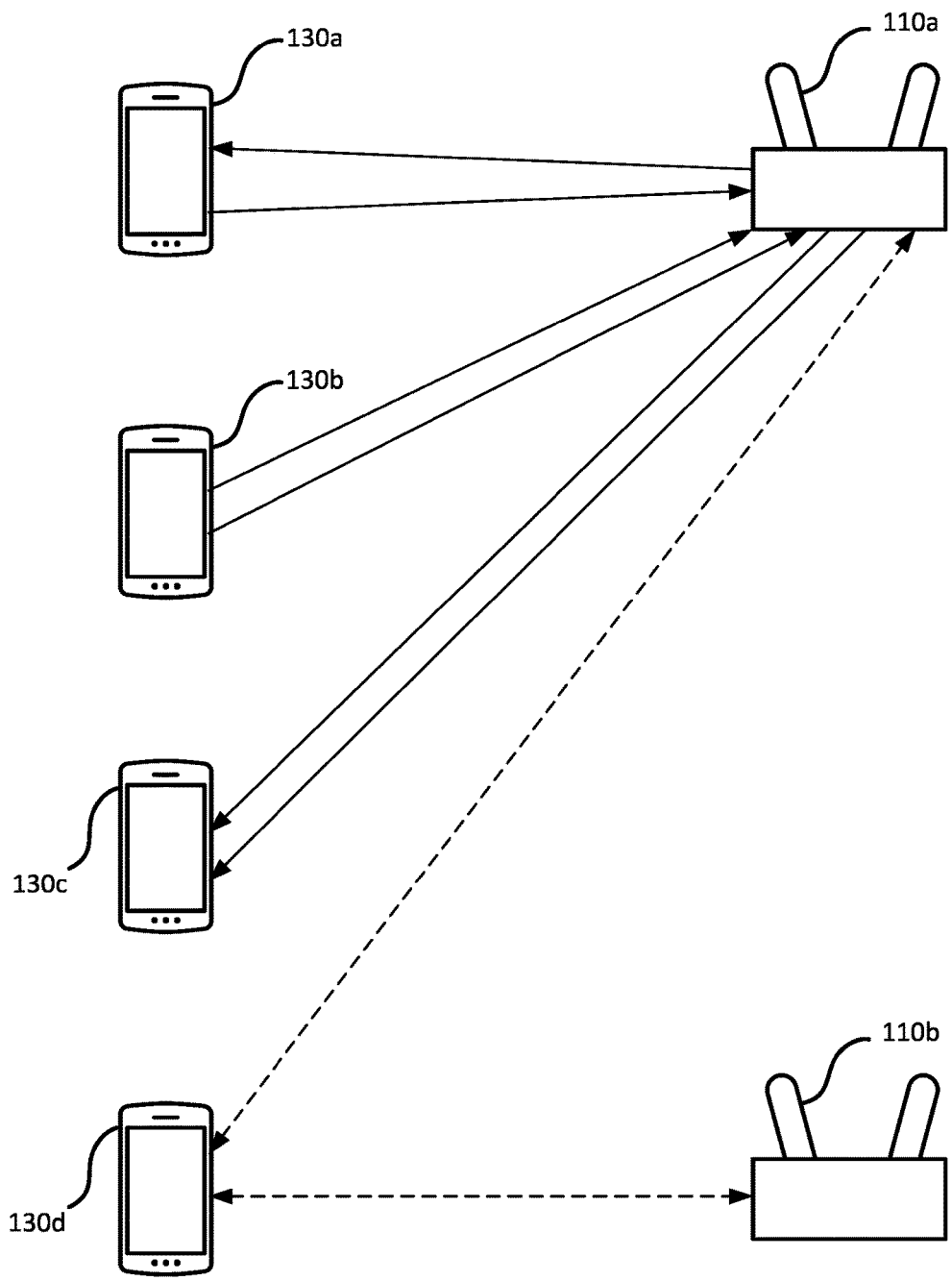
FIG. 2 illustrates differently multilink operations possible in the wireless network, according to embodiments of the present disclosure.

FIG. 2 illustrates differently multilink operations possible in the wireless network 120, according to embodiments of the present disclosure.

A first STA 130a is shown in simultaneous transmit and receive (STR) multilink communications with a first AP 110a. In an STR multilink communications arrangement, a STA 130 is capable of sending uplink traffic to an associated AP 110 on a first channel and receiving downlink traffic from the AP 110 on a second channel at the same time. Although shown using two channels, in various embodiments, a STR-capable pair of STAs 130 and APs 110 may use more than two channels for STR multilink communications, with various numbers of uplink or downlink channels.

A second STA 130b and a third STA 130c are shown in non-STR multilink communications with the first AP 110a. In non-STR multilink communications arrangements, a STA 130 uses two or more channels to communicate with an associated AP 110, but engages in unidirectional communications. For example, the second STA 130b uses two or more channels for uplink communications at the same time (but no channels for downlink communications) while the third STA 130c uses two or more channels for downlink communications at the same time (but no channels for uplink communications). In various embodiments, a STA 130 engaged in non-STR multilink communications may be capable of STR multilink communications, but is scheduled by the associated AP 110 (e.g., due to traffic queueing) for non-STR communications in a given timeslot; however, some STA 130 engaged in non-STR multilink communications may be capable of only unidirectional multilink communications. Although shown using two channels, in various embodiments, a non-STR-capable pair of STAs 130 and APs 110 may use more than two channels for non-STR multilink communications, with various numbers of uplink or downlink channels.

A fourth STA 130d is shown engaged in Enhanced Single Radio (ESR) communications, where the fourth STA 130 dynamically switches a single radio between communicating with one of the first AP 110a and a second AP 110b at a given time. The fourth STA 130d is within range of two or more APs 110, and in various embodiments can send uplink communications to one or more of the APs 110 and receive downlink communication from one or more of the AP 110. Each AP 110 associates one channel with the STA 130. Although shown using two channels with two associated APs 110, in various embodiments, a ESR-capable STAs 130 may be in communication with two or more APs 110 (and associated channels) for ESR communications, with various numbers of uplink or downlink channels.

Figure 3:
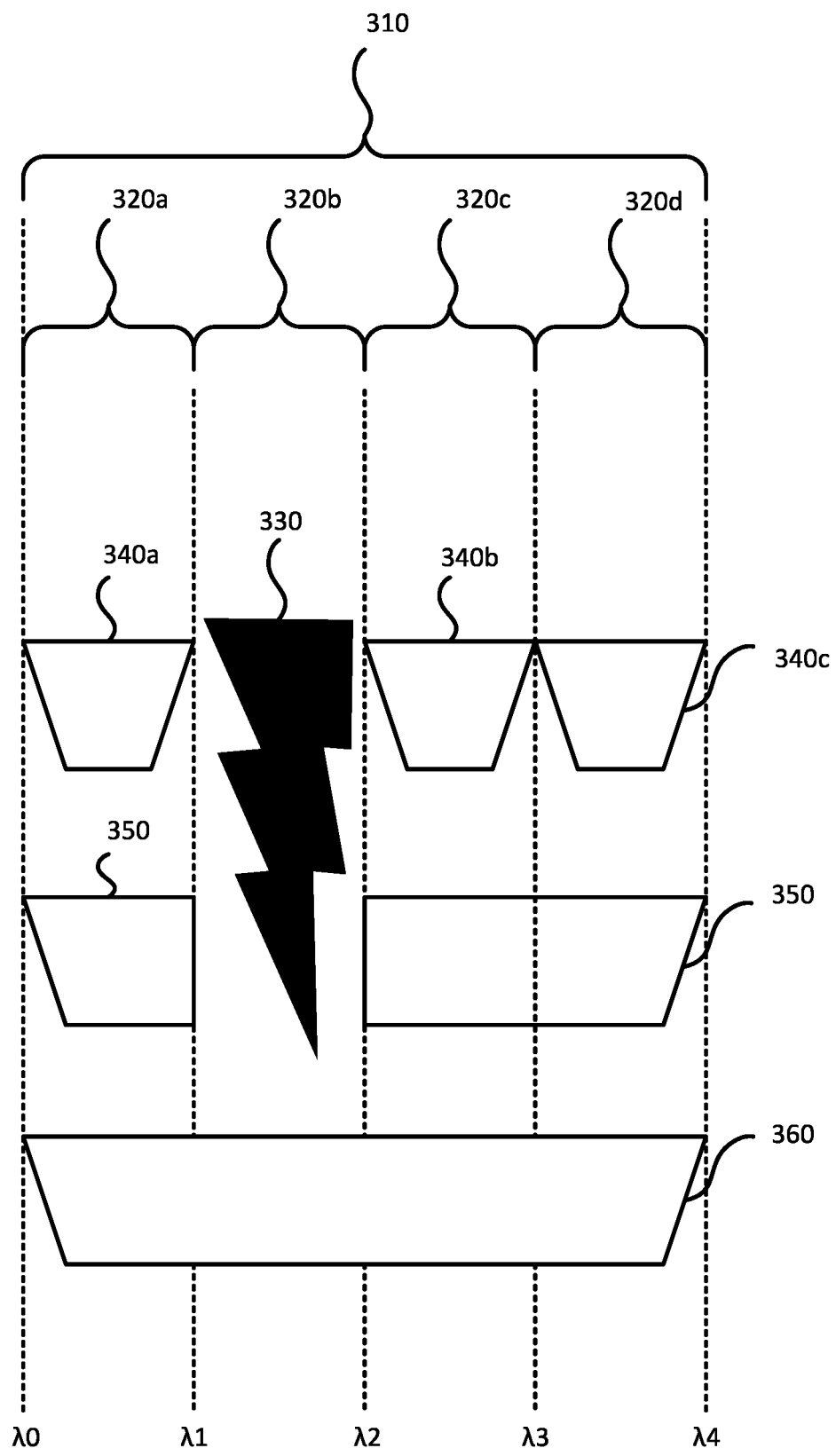
FIG. 3 illustrates channel assignment, according to embodiments of the present disclosure.

FIG. 3 illustrates channel assignment, including preamble puncturing, multilink communication, or full channel assignment, according to embodiments of the present disclosure. A macro-channel 310 spans a frequency band from $\lambda_0$ to $\lambda_4$, while four micro-channels 320a-d (generally or collectively, micro-channel 320) span frequency bands from $\lambda_0$ to $\lambda_1$, $\lambda_1$ to $\lambda_2$, $\lambda_2$ to $\lambda_3$, and $\lambda_3$ to $\lambda_4$. The micro-channels 320 when combined occupy the same bandwidth as a macro-channel 310. For example, a macro-channel 310 of 80 Megahertz (MHz) has the same bandwidth as four micro-channels 320a-d of 20 MHz. When overlapped, the micro-channels 320 occupy the same frequency band as the macro-channel 310, but may describe different named channels. For example, the four micro-channels 320a-d may be defined on channels 52, 56, 60, and 64, while the macro-channel 310 is defined on channel 58 (to encompass all of channels 52, 56, 60, and 64).

As used herein, the lowest frequency micro-channel 320 of a set of micro-channels 320 may be referred to as a primary channel, and the other micro-channels 320 may be referred to as secondary channels. In the current examples, the first micro-channel 320a would be the primary channel, and the second through fourth sub-channels 320b-d would be secondary channels.

When used individually, each micro-channel 320 may be assigned to different STAs 130 or to one STA 130 for multilink operations. Each transmission over a micro-channel 320 includes various overhead sections (e.g., header fields, checksum fields) and payload data, as does a transmission over a macro-channel 310. Accordingly, as the macro-channel 310 includes one set of overhead section for the same amount of bandwidth as the collective micro-channels 320 in the same frequency band, the macro-channel 310 can offer greater efficiency for data throughput. However, the micro-channels 320 can offer greater flexibility in channel assignment and (potentially) for interference mitigation or avoidance compared to the associated macro-channel 310.

In various embodiments, the AP 110 can change the width of a channel assigned for communications for a STA 130 on a frame-by-frame basis, so that a STA 130 may initially use the macro-channel 310, and switch to using one or more of the micro-channels 320 if interference 330 is detected between $\lambda_0$ and $\lambda_4$. Depending on the frequencies that the interference 330 spans, how long or how often the interference 330 is observed, and the capabilities of the AP 110 and the STA 130, when a channel assignment is changed from the macro-channel 310 to the micro-channels 320, various different spectrum assignments may be considered.

When the AP 110 and STA 130 support multilink communications, the AP 110 can assign multiple micro-channels 320 for communication with the STA 130. For example, when the interference 330 is located in the second micro-channel 320b, the AP 110 may assign one or more of the remaining micro-channels 320 to the STA 130. For example, when the AP 110 and the STA 130 do not support multilink communications, the AP 110 may assign one of a first free frame 340a (generally or collectively, free frames 340) in the first micro-channel 310a, a second free frame 340b in the third micro-channel 320c, or a third free frame 340c in the fourth micro-channel for use to the STA 130. When the AP 110 and the STA 130 do support multilink communications, the AP 110 may assign one or more of the free frames 340 to the STA 130. In various embodiments, the free frames 340 may be assigned for uplink communications or downlink communications, and (if supported) when two or more free frames are assigned, some may be used for uplink while some are used simultaneously for downlink communications.

In various embodiments, depending on the frequency filtering capabilities of the STA 130, some of the free frames 340 may be unavailable, despite being free of interference. Accordingly, the capabilities of the STA 130 can effectively allow the interference 330 to bleed over into adjacent frequency bands when guard frequencies, filters, or channel spacing requirements prevent the use of channels adjacent to one another or adjacent to interference 330. For example, a STA 130 using a filter that cannot differentiate the interference 330 in the second micro-channel 320b from the adjacent micro-channels 320, those adjacent micro-channels 320 may be unavailable for use with free frames 340, despite the interference 330 not overlapping the associated micro-channels 320. However, the affected STA 130 may still be able to use the fourth micro-channel 320d for communications, as the filter of the STA 130 has sufficient discretion to prevent bleed over from the second micro-channel 320b to the fourth micro-channel 320d.

When the AP 110 and STA 130 support preamble puncturing, instead of falling back to using the micro-channels 320, the AP 110 can allow the STA 130 to transmit on the primary channel and any of the secondary channels not overlapped with the interference 330 as one coherent punctured frame 350. For example, when the interference 330 overlaps with the frequencies used by the second micro-channel 320b, the AP 110 can assign a punctured frame 350 to the STA 130 that omits frequencies $\lambda_1$ to $\lambda_2$ but includes frequencies from $\lambda_0$ to $\lambda_1$ and $\lambda_2$ to $\lambda_4$. Although discussed in relation to interference that overlaps the second micro-channel 320b, preamble puncturing can be used when a different secondary channel or more than one secondary channel 302 is overlapped.

Once the interference is no longer present, the AP 110 may return to assigning a full frame 360 that covers the macro-channel 310.

Accordingly, the network controller 140 monitors the external signaling devices 150 to identify when interference 330 is generated and which channels that interference 330 affects as part of determining whether to use punctured frames 350 for the STAs 130 capable of benefiting from preamble puncturing.

Figure 4:
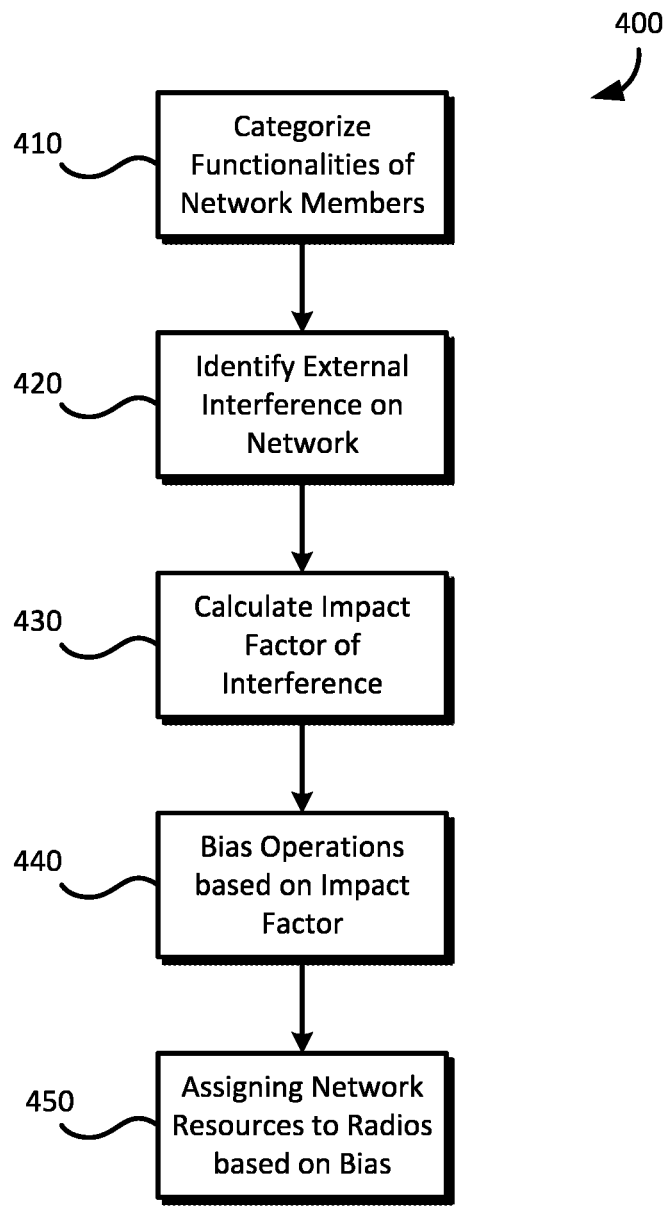
FIG. 4 is a flowchart for a method to provide dynamic spectrum access mode based on station capabilities, according to embodiments of the present disclosure.

FIG. 4 is a flowchart for a method 400 to provide dynamic spectrum access mode based on station capabilities, according to embodiments of the present disclosure. Method 400 begins a block 410, where the network controller 140 categorizes the functionalities of the member devices in the wireless network 120. In various embodiments, the APs 110 that are members of the wireless network 120 are categorized based on whether the AP 110 supports multilink operations (including STR, non-STR, or ESR-supported multilink communications), preamble puncturing, both multilink operations and preamble puncturing, or neither multilink operations nor preamble puncturing. Similarly, the network controller 140 categorizes the STAs 130 that are connected to the APs 110, where the STAs 130 are categorized based on whether the STAs 130 are capable of STR multilink communications, non-STR multilink communications, ESR communications, or preamble puncturing, or combinations thereof.

At block 420, the network controller 140 identifies external interference on the wireless network 120, such as may be induced by various external signaling devices 150 on one or more channels used by the wireless network 120. In various embodiments, the network controller 140 identifies the interference sources as radios from OBSSs (either as managed neighbors 150a or rogue APs 150b) using the same or compatible communications standards as the wireless network 120, or as high-priority incumbent signaling devices 150c (e.g., Doppler weather stations) that use different signaling standards than the AP 110. The network controller 140 identifies the characteristics of the interference generated by the various sources, indicating the channels affected, duration and signal strength of the interference, how often the interference is observed (e.g., the periodicity/frequency of the interference), and the like.

At block 430, the network controller 140 calculates an impact factor of the interference on the operations of STAs 130 within the wireless network 120. The effect of the interference may vary based on what channels are affected, how often those channels are affected, and how the various STAs 130 can work around the interference. For example, interference on a primary channel may prevent STAs 130 from using preamble puncturing, while interference on a secondary channel may prevent STAs 130 from using that secondary channel, but still permits the use of preamble puncturing (so long as the affected channel is avoided). In another example, a first STA 130a may be specified (e.g., by a manufacturer) to use signal separation of at least 20 MHz, so that 20 MHz channels adjacent to an interference-prone 20 MHz channel are not usable, despite being free of interference, while a second STA 130b specified to use a lower signal separation may be able to use those adjacent channels. Accordingly, the impact factor identifies portions of the bandwidth that are usable by the individual STAs 130.

In addition to identifying the bandwidth assignment schemes for the individual STAs 130, the impact factor evaluates the overall effect of one or more interference sources on the collective (one or more) STAs 130 in the wireless network 120. Accordingly, the overall effect of the interference across the wireless network 120 can result in one of preamble puncturing or multilink operations, if applied solely to the signaling operations for the STAs 130, being better for overall network stability, while individually worse for a non-majority share of the STAs 130. Therefore, the impact factor identifies the numbers of STAs 130 that support different formats of communications (e.g., STR or non-STR multilink communication vs. ESR or no multilink communications, multilink communications vs. preamble puncturing) so that the network controller 140 assign channels based on which set of STAs 130 has more members. In various embodiments, a given STA 130 may belong to two or more groups (e.g., capable of both multilink operations and preamble puncturing), and would therefore be counted as a member of both groups for purposes of determining the relative sizes of different potential groups of STAs 130.

At block 440, the network controller 140 biases operations of the wireless network 120 to provide high-bandwidth communications in light of the interference and the calculated impact factor. The biased operations seek to assign the available bandwidth for the greatest amount of use by the STAs 130 when operating in a potentially interference-prone environment. To that end, operations during interference-free time periods are biased for easy and rapid transition to operation during time periods that include interference.

For example, if interference is known to affect a primary channel, the network controller 140 may bias channel assignment during interference-free time periods away from using a full frame 360 over the macro-channel 310, as preamble puncturing is not available when interference 330 is present. Additionally or alternatively, when a STA 130 is not capable of preamble puncturing (either due to lack of functionality or channel separation specifications for the STA 130), the network controller 140 may bias channel assignment to assign the individual STA 130 to a set of channels that are unaffected by interference or that the individual STA 130 can work around to continue transmitting in a subset of the unaffected micro-channels 320 with free frames 340 when interference 330 is present.

In another example, if interference is known to affect secondary channels (and channel separation specifications for the STAs 130 allow the use of the adjacent channels), the network controller 140 may bias channel assignment during interference free-time periods towards using full frames 360 in the macro-channels 310, as using a single macro-channel 310 is often more bandwidth efficient than using an equivalent bandwidth of micro-channels 320. Accordingly, when interference 330 is detected, the assigned STA 130 may switch from using a full frame 360 in the macro-channel 310 to using a punctured frame 350 that avoids the micro-channel(s) 320 affected by the interference 330.

Accordingly, by biasing the assignment of network channels to the various STA 130 based on the functionalities of those STA 130, and the characteristics of the interference 330 in the wireless network 120, the network controller 140 can switch the STAs 130 between interference-free and interference-mitigation modes of operation with lower change over effects, thereby improving the efficiency of the wireless network 120 (e.g., requiring fewer channel reassignments) and improving of use of available bandwidth in the environment 100.

At block 450, the network controller 140 assigns network resources for the radios in the APs 110 and the STAs 130 based on the bias for multilink operation or preamble puncturing when interference is present. Accordingly, the network controller 140 assigns network resources for each STA 130 to communicate with the associated APs via one of multilink communications or preamble puncturing based on the impact factor of the interference 330. The network resources may include various time frames that indicate which channels the STA 130 are to use and what mode to operate in when interference is detected (or expected) and which channels the STA 130 are to use and what mode to operate in when interference is not detected (or expected).

For example, a first STA 130a that is capable of operating in preamble puncturing mode may be assigned a macro-channel 310 to use with full frames 360 for a first time period, and transitions to use a punctured frame 350 when interference 330 is expected or detected. In contrast, a second STA 130b that is capable of operating in multilink mode may be assigned (at a different time) the same channel as the first STA 130a was assigned to, and uses several micro-channels 320 to send or receive data using several free frames 340 (whether in STR or non-STR mode) and stops using one or more of the micro-channels 320 when interference 330 is present on those channels, but continues using the non-overlapped micro-channels 320.

The network controller 140 applies the bias for assignment of the available channels mitigates the effects of the interference while providing high-bandwidth communications according to the impact factor. Method 400 may conclude at block 450, and may repeat at a predefined time interval, in response to changes in the interference sources, in response to STAs 130 joining or leaving the wireless network 120, or changes in the deployment of the APs 110.

Figure 5:
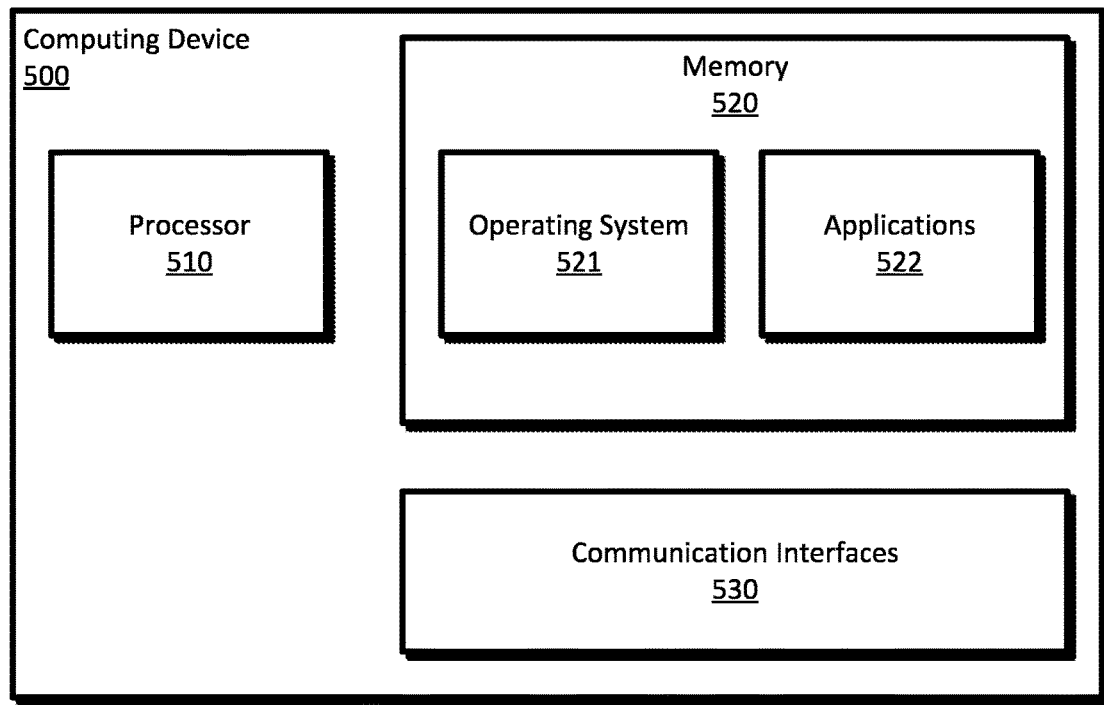
FIG. 5 illustrates hardware of a computing device, according to embodiments of the present disclosure.

FIG. 5 illustrates hardware of a computing device 500 such as can be included in an AP 110, STA 130, or network controller 140 as described herein. The computing device 500 includes a processor 510, a memory 520, and communication interfaces 530. The processor 510 may be any processing element capable of performing the functions described herein. The processor 510 represents a single processor, multiple processors, a processor with multiple cores, and combinations thereof. The communication interfaces 530 facilitate communications between the computing device 500 and other devices. The communication interfaces 530 are representative of wireless communications antennas (both omnidirectional and directional), various steering mechanisms for the antennas, and various wired communication ports including out-pins and in-pins to a microcontroller. The memory 520 may be either volatile or non-volatile memory and may include RAM, flash, cache, disk drives, and other computer readable memory storage devices. Although shown as a single entity, the memory 520 may be divided into different memory storage elements such as RAM and one or more hard disk drives.

As shown, the memory 520 includes various instructions that are executable by the processor 510 to provide an operating system 521 to manage various functions of the computing device 500 and one or more applications 522 to provide various functionalities to users of the computing device 500, which include one or more of the functions and functionalities described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   categorizing functionalities of Access Points (APs) and mobile stations (STAs) in a wireless network;
   identifying interference induced by external signaling devices on channels used by the wireless network;
   calculating an impact factor of the interference based on a proximity of the external signaling devices to the wireless network, a pattern of the external signaling devices, and an extent of overlap with frequencies used by the external signaling devices and the wireless network; and
   in response to identifying a given STA that is paired with a given AP in the wireless network, wherein the given STA and the given AP are both categorized as being capable of both multilink communications and preamble puncturing, assigning network resources for the given STA to communicate with the given AP via one of multilink communications or preamble puncturing based on the impact factor of the interference.

2. The method of claim 1, further comprising:
   biasing assignment of the channels in the wireless network to provide a first set of STAs that are incapable of multilink operation or preamble puncturing to a first set of channels unaffected by the interference and to provide a second set of STAs that are capable or one or more of multilink operation and preamble puncturing to a second set of channels at least partially affected by the interference based on the functionalities of the STAs.

3. The method of claim 1, further comprising:
   biasing assignment of the channels in the wireless network to provide multilink operations for a first set of STAs capable of Enhanced Single Radio (ESR) multilink communications over preamble puncturing and to provide a second set of STAs that support multilink communications with preamble puncturing over multilink communications.

4. The method of claim 1, further comprising:
   identifying a first number of the STAs that support STR or non-STR multilink communications and a second number of the STAs that support ESR or do not support multilink communications; and
   biasing assignment of the channels for preamble puncturing when the first number is higher than the second number or for multilink communications when the second number is higher than the first number.

5. The method of claim 1, wherein the impact factor identifies a portion of usable bandwidth in a given channel over time when the given channel is affected by the interference, wherein the portion of the usable bandwidth is identified as including or excluding a primary channel for multilink operation.

6. The method of claim 1, wherein:
   the APs are categorized as one of:
   supporting both multilink operations and preamble puncturing;
   supporting one of multilink operations and preamble puncturing; and
   supporting neither multilink operations nor preamble puncturing; and
   the STAs are categorized as at least one of:
   capable of simultaneous transmit and receive (STR) multilink communications;
   capable of non-STR multilink communications;
   capable of Enhanced Single Radio (ESR) communications to dynamically switch a single radio between communicating with two or more APs;
   capable of preamble puncturing; and
   supporting neither multilink operations nor preamble puncturing.

7. The method of claim 1, wherein the external signaling devices include at least one of:
   radios from an Overlapping Basic Service Set (OBSS) that are classified into one of:
   managed neighbors in a shared network with the wireless network; or
   rogue APs that are not included in the shared network; or
   incumbent high-priority devices using a different signaling standard than the APs.

8. A system, comprising:
   a processor; and
   a memory including instructions that when performed by the processor configure the processor to perform operations comprising:
   categorizing functionalities of Access Points (APs) and mobile stations (STAs) in a wireless network;
   identifying interference induced by external signaling devices on channels used by the wireless network;
   calculating an impact factor of the interference based on a proximity of the external signaling devices to the wireless network, a duty cycle of the external signaling devices, and an extent of overlap with frequencies used by the external signaling devices and the wireless network; and
   in response to identifying a given STA that is paired with a given AP in the wireless network, wherein the given STA and the given AP are both categorized as being capable of both multilink communications and preamble puncturing, assigning network resources for the given STA to communicate with the given AP via one of multilink communications or preamble puncturing based on the impact factor of the interference.

9. The system of claim 8, wherein the operations further comprise:
   biasing assignment of the channels in the wireless network to provide a first set of STAs that are incapable of multilink operation or preamble puncturing to a first set of channels unaffected by the interference and to provide a second set of STAs that are capable or one or more of multilink operation and preamble puncturing to a second set of channels at least partially affected by the interference based on the functionalities of the STAs.

10. The system of claim 8, wherein the operations further comprise:
    biasing assignment of the channels in the wireless network to provide multilink operations for a first set of STAs capable of Enhanced Single Radio (ESR) multilink communications over preamble puncturing and to provide a second set of STAs that support multilink communications with preamble puncturing over multilink communications.

11. The system of claim 8, wherein the operations further comprise:
identifying a first number of the STAs that support STR or non-STR multilink communications and a second number of the STAs that support ESR or do not support multilink communications; and
biasing assignment of the channels for preamble puncturing when the first number is higher than the second number or for multilink communications when the second number is higher than the first number.

12. The system of claim 8, wherein the impact factor identifies a portion of usable bandwidth in a given channel over time when the given channel is affected by the interference, wherein the portion of the usable bandwidth is identified as including or excluding a primary channel for multilink operation.

13. The system of claim 8, wherein:
the APs are categorized as one of:
supporting both multilink operations and preamble puncturing;
supporting one of multilink operations and preamble puncturing; and
supporting neither multilink operations nor preamble puncturing; and
the STAs are categorized as at least one of:
capable of simultaneous transmit and receive (STR) multilink communications;
capable of non-STR multilink communications;
capable of Enhanced Single Radio (ESR) communications to dynamically switch a single radio between communicating with two or more APs;
capable of preamble puncturing; and
supporting neither multilink operations nor preamble puncturing.

14. The system of claim 8, wherein the external signaling devices include at least one of:
radios from an Overlapping Basic Service Set (OBSS) that are classified into one of:
managed neighbors in a shared network with the wireless network; or
rogue APs that are not included in the shared network; or
incumbent high-priority devices using a different signaling standard than the APs.

15. A non-transitory computer readable storage medium storing instructions that when executed by a processor perform operations comprising:
categorizing functionalities of Access Points (APs) and mobile stations (STAs) in a wireless network;
identifying interference induced by external signaling devices on channels used by the wireless network;
calculating an impact factor of the interference based on a proximity of the external signaling devices to the wireless network, a duty cycle of the external signaling devices, and an extent of overlap with frequencies used by the external signaling devices and the wireless network; and
in response to identifying a given STA that is paired with a given AP in the wireless network, wherein the given STA and the given AP are both categorized as being capable of both multilink communications and preamble puncturing, assigning network resources for the given STA to communicate with the given AP via one of multilink communications or preamble puncturing based on the impact factor of the interference.

16. The non-transitory computer readable storage medium of claim 15, wherein the operations further comprise:
biasing assignment of the channels in the wireless network to provide a first set of STAs that are incapable of multilink operation or preamble puncturing to a first set of channels unaffected by the interference and to provide a second set of STAs that are capable or one or more of multilink operation and preamble puncturing to a second set of channels at least partially affected by the interference based on the functionalities of the STAs.

17. The non-transitory computer readable storage medium of claim 15, wherein the operations further comprise:
biasing assignment of the channels in the wireless network to provide multilink operations for a first set of STAs capable of Enhanced Single Radio (ESR) multilink communications over preamble puncturing and to provide a second set of STAs that support multilink communications with preamble puncturing over multilink communications.

18. The non-transitory computer readable storage medium of claim 15, wherein the operations further comprise:
identifying a first number of the STAs that support STR or non-STR multilink communications and a second number of the STAs that support ESR or do not support multilink communications; and
biasing assignment of the channels for preamble puncturing when the first number is higher than the second number or for multilink communications when the second number is higher than the first number.

19. The non-transitory computer readable storage medium of claim 15, wherein the impact factor identifies a portion of usable bandwidth in a given channel over time when the given channel is affected by the interference, wherein the portion of the usable bandwidth is identified as including or excluding a primary channel for multilink operation.

20. The non-transitory computer readable storage medium of claim 15, wherein:
the APs are categorized as one of:
supporting both multilink operations and preamble puncturing;
supporting one of multilink operations and preamble puncturing; and
supporting neither multilink operations nor preamble puncturing; and
the STAs are categorized as at least one of:
capable of simultaneous transmit and receive (STR) multilink communications;
capable of non-STR multilink communications;
capable of Enhanced Single Radio (ESR) communications to dynamically switch a single radio between communicating with two or more APs;
capable of preamble puncturing; and
supporting neither multilink operations nor preamble puncturing.

* * * * *